United States Patent
Das et al.

(10) Patent No.: US 10,459,066 B2
(45) Date of Patent: Oct. 29, 2019

(54) SELF-ADAPTIVE SYSTEM AND METHOD FOR ROBUST WI-FI INDOOR LOCALIZATION IN LARGE PUBLIC SITE

(71) Applicant: Robert Bosch GmbH, Stuttgart (DE)

(72) Inventors: Samarjit Das, Sewickley, PA (US); Joao Pedro De Sousa, Pittsburgh, PA (US); Ashwin Shenoi, Atlanta, GA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/066,588

(22) PCT Filed: Jan. 2, 2017

(86) PCT No.: PCT/EP2017/050026
§ 371 (c)(1),
(2) Date: Jun. 27, 2018

(87) PCT Pub. No.: WO2017/114969
PCT Pub. Date: Jul. 6, 2017

(65) Prior Publication Data
US 2019/0018102 A1    Jan. 17, 2019

Related U.S. Application Data

(60) Provisional application No. 62/273,758, filed on Dec. 31, 2015.

(51) Int. Cl.
*H04L 1/16* (2006.01)
*G01S 5/02* (2010.01)
*H04W 64/00* (2009.01)
*G01C 21/20* (2006.01)
*G01S 11/06* (2006.01)

(52) U.S. Cl.
CPC .......... *G01S 5/0252* (2013.01); *G01C 21/206* (2013.01); *G01S 5/0278* (2013.01); *G01S 11/06* (2013.01); *H04W 64/00* (2013.01); *H04W 64/003* (2013.01)

(58) Field of Classification Search
CPC . H04W 48/08; H04W 36/0022; H04W 76/02; H04W 4/02; H04W 64/00; H04B 17/318
USPC ................................. 370/328, 338; 455/411
See application file for complete search history.

(56) References Cited

U.S. PATENT DOCUMENTS

2012/0149388 A1   6/2012   West et al.
2017/0094454 A1*  3/2017   Pon ...................... H04W 24/10

FOREIGN PATENT DOCUMENTS

EP    1 500 947 A1    1/2005
GB    2517691 A       3/2015

OTHER PUBLICATIONS

International Search Report corresponding to PCT Application No. PCT/EP2017/050026, dated Mar. 28, 2017 (3 pages).

* cited by examiner

*Primary Examiner* — Phuoc H Doan
(74) *Attorney, Agent, or Firm* — Maginot Moore & Beck LLP (57) ABSTRACT

A robust WiFi indoor localization system for large public sites includes a self-adaptive system communicatively coupled to a plurality of clients. The self-adaptive system includes a processor, a computer readable medium, and a communication interface module.

9 Claims, 13 Drawing Sheets

SELF-ADAPTIVE SYSTEM AND METHOD FOR ROBUST WI-FI INDOOR LOCALIZATION IN LARGE PUBLIC SITE

CROSS-REFERENCE TO RELATED APPLICATION

This application is a 35 U.S.C. § 371 National Stage Application of PCT/EP2017/050026, filed on Jan. 2, 2017, which claims the benefit of priority to a U.S. provisional patent application Ser. No. 62/273,758, filed Dec. 31, 2015, the contents of which are incorporated herein by reference as if fully enclosed herein.

FIELD

This disclosure relates generally to crowd sourcing data collection and machine learning process and particularly to system and method for robust Wi-Fi indoor localization in large public sites that is self-adaptive to dynamic Wi-Fi environments.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure related to systems and methods for robust WiFi indoor localization in large public sites includes a self-adaptive device communicatively coupled to a plurality of clients. For example, a self-adaptive device comprises a computer readable medium coupled to a client machine and a processor for receiving data from the computer readable medium and training an array of support vector machines to render a posterior probability associated with the data, wherein the rendering the posterior probability comprises rendering a region of the client machine has been changed. The processor comprising a machine learning module configured to render a posterior probability associated with the data, wherein the data comprising WiFi RSSI vector data and a region with an identification. The device further comprises a communication interface module coupled to the client machine, the communication interface module configured to receive RSSI vector data and the region, wherein the communication interface module labeling the region with the identification. In one embodiment, the data is stored in the computer readable medium and the computer readable medium is located on a cloud network. The processor further comprises a detection module configured to detect a change in the region and request training data from the client device.

According to another exemplary embodiment of the disclosure, a device comprises a non-transitory computer-readable medium for carrying or having computer-executable instructions to receive data from a client device, the instructions causing a machine to train an array of support vector machines, render a posterior probability associated with the data wherein the data include WiFi RSSI vector data and a region, and detect a change in the region. The device further comprises an instruction to request training data from the client device.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Figure 1:
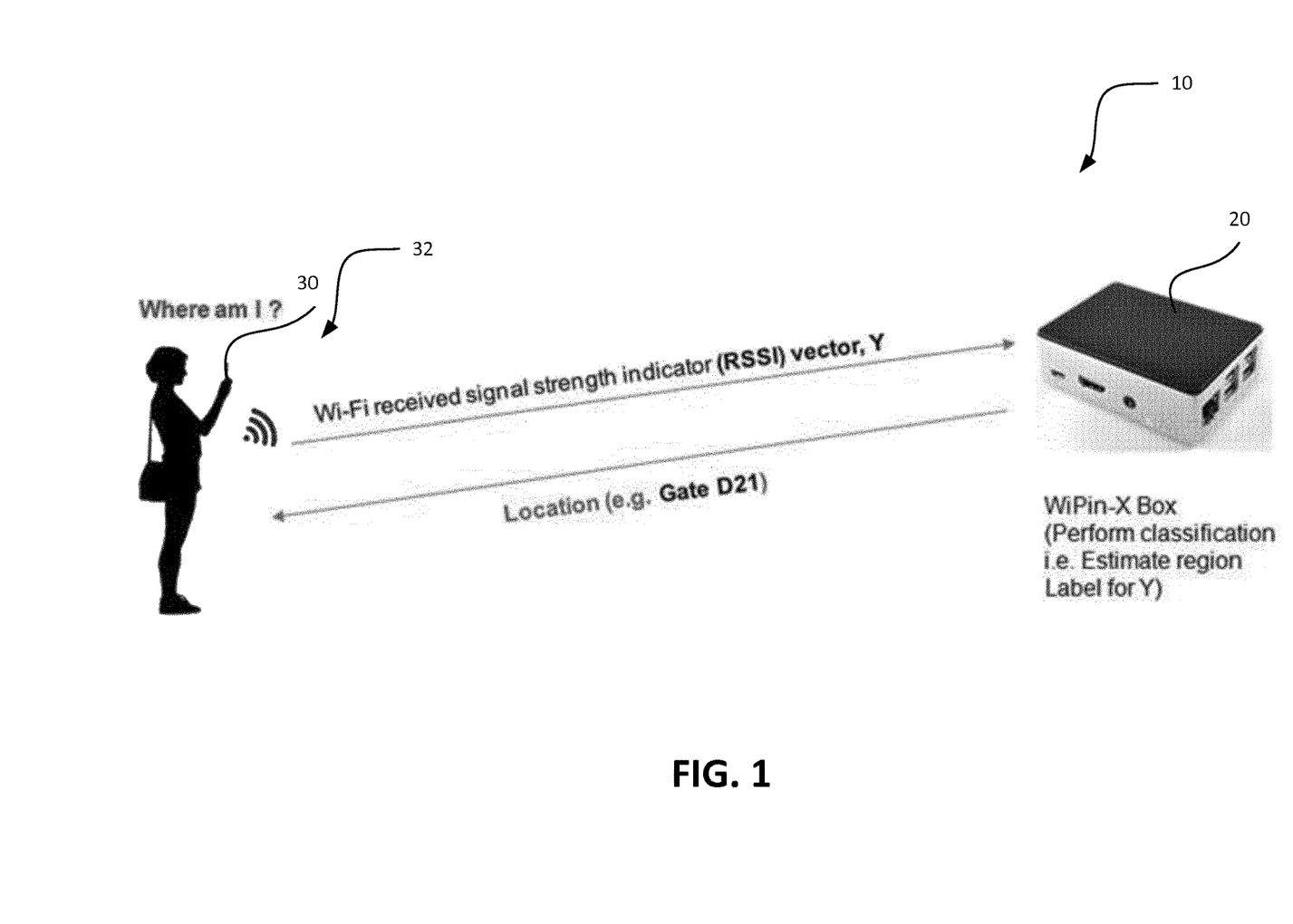
FIG. 1 is a scene illustrating a self-adaptive device communicatively coupled to a client device within a site in accordance to an exemplary embodiment of the disclosure.

FIG. 1 is a scene illustrating a self-adaptive device 20 communicatively coupled to a client device or a client machine 30 within a site 10 in accordance to an exemplary embodiment of the disclosure. As a user 32 walks into a public space with a client machine 30, e.g. cellular phone, the client machine 30 measures the Wi-Fi signal strengths received from a plurality of access points, also referred as Wi-Fi routers in the environment and sends the data to a self-adaptive device 20. The self-adaptive device 20 is capable of providing region level localization in large indoor spaces via any client machine 30 and using existing Wi-Fi access point in a space for enabling indoor location awareness. The space may be malls, large retail stores, airports, hospitals, convention center, and any public commonplaces. The self-adaptive device 20 executes a computer object code including proprietary algorithm to robustly identify the region in the indoor space from which the user sent out the signal strength data. The self-adaptive device 20 provides reliable estimate of indoor location state up to a region level accuracy. The client machine 30 may be a cellular phone, a tablet, a personal digital assistant (PDA), a laptop, a wearable device, or any type of electronic devices with wireless capability. The self-adaptive device 20 is configured to operate with a diverse range of client machines 30 having a diverse type of Wi-Fi circuitry built-in. The self-adaptive device 20 is also very robust to operate in a dynamic Wi-Fi environments which will described further in details below.

Figure 2:
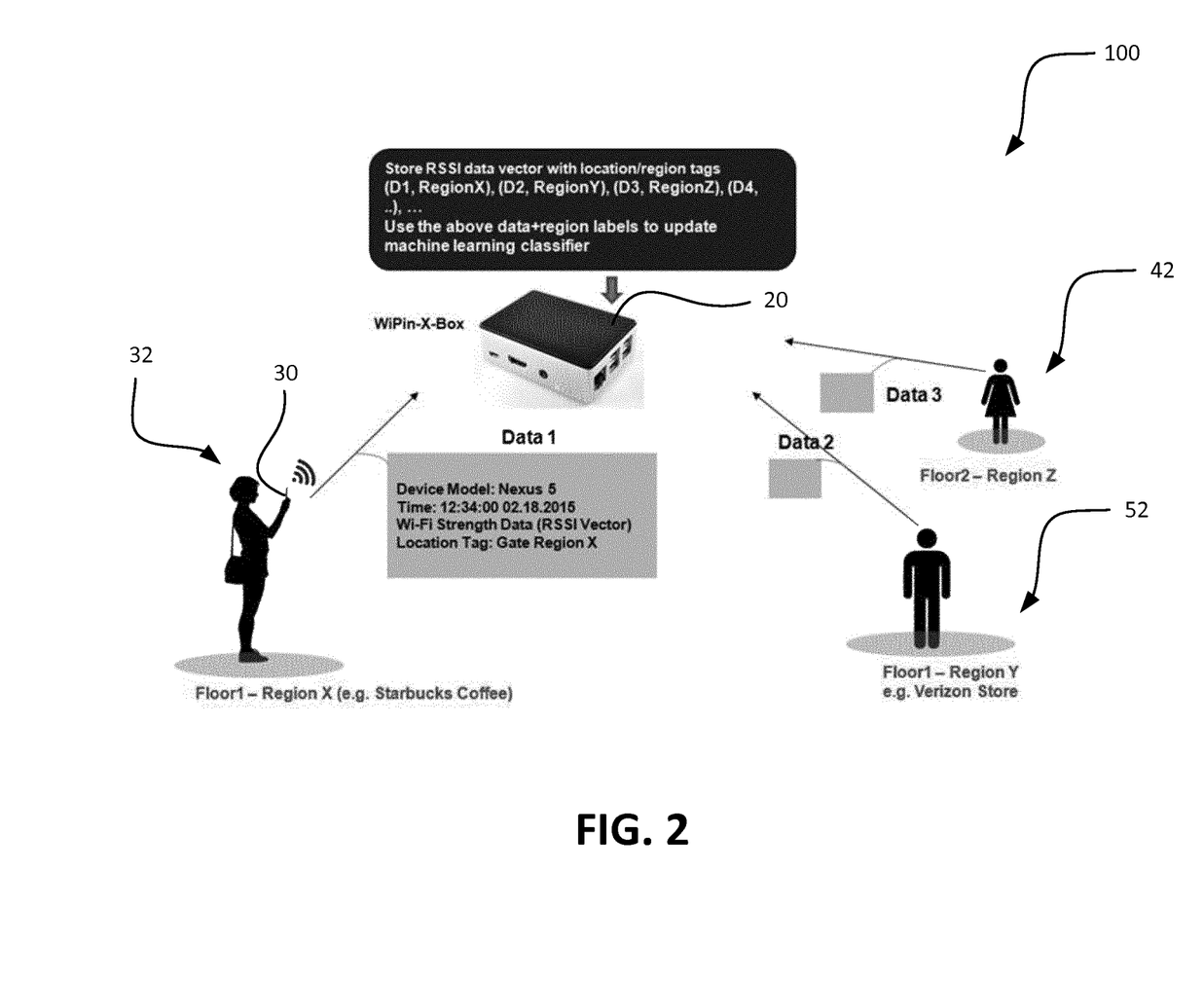
FIG. 2 is a scene illustrating a self-adaptive device communicatively coupled to a client device within a site in accordance to another embodiment of the disclosure.

FIG. 2 is a scene illustrating a self-adaptive device 20 communicatively coupled to an array of client devices or client machines 30, 40, 50 within a site 100 in accordance to another embodiment of the disclosure. FIG. 2 is similar to FIG. 1, except, separate group of users 32, 42, 52 are detected in various indoor regions. For performing Wi-Fi based region identification, the self-adaptive device 20 learns the distribution of Wi-Fi patterns across various indoor regions. In order to do so, the self-adaptive device 20 employs a community-based, also referred as crowd sourcing, training technique. Every user walks in to the public spaces contributes Wi-Fi strength data corresponding to different regions which may be used to continually adapt the region classification models within the self-adaptive device 20.

The self-adaptive device 20 employs machine learning based anomaly detection technique to automatically identify changed Wi-Fi distributions and re-learns the updated model parameters through fresh data samples from community training. The self-adaptive device 20 is also capable to request fresh data from the users 32, 42, 52 in case of model adaptation randomly or as needed. However, if there is a requirement for model adaptation due to change in the Wi-Fi environment, the self-adaptive device 20 identifies the changes and triggers an adaptation process within the self-adaptive device 20.

Figure 3:
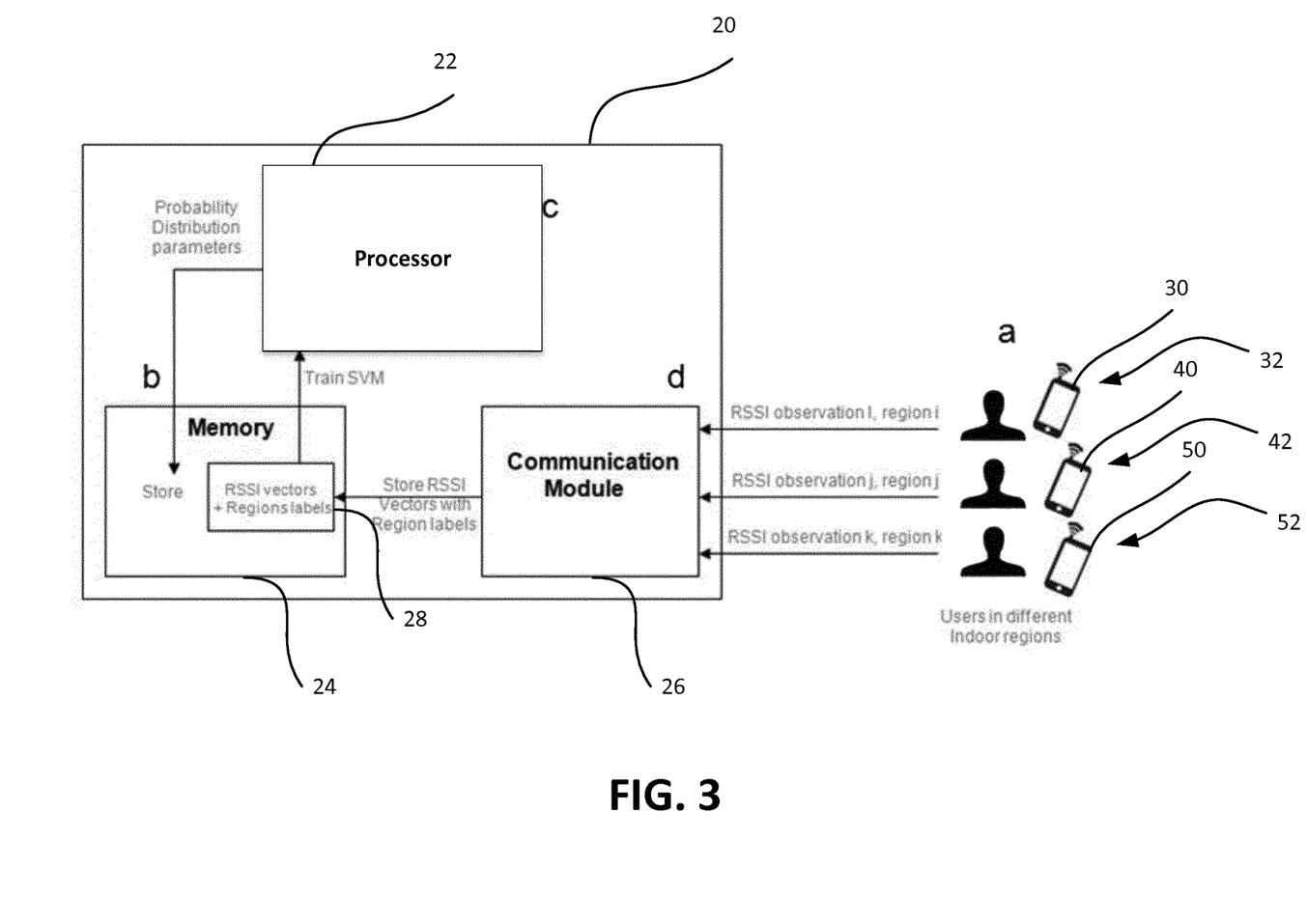
FIGS. 3-5 illustrates various block diagram of an exemplary embodiment of a self-adaptive device.
Figure 4:
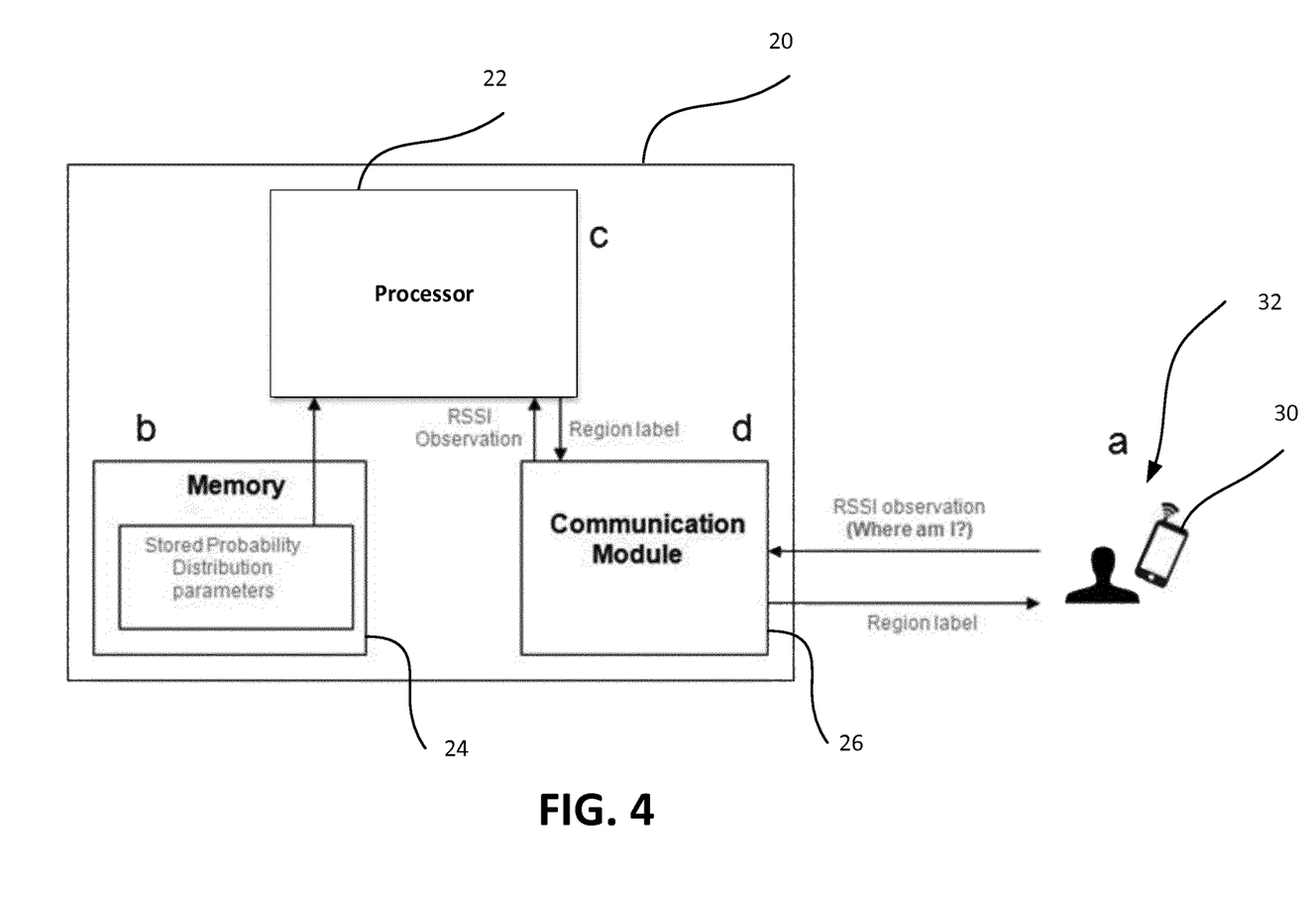
Figure 5:
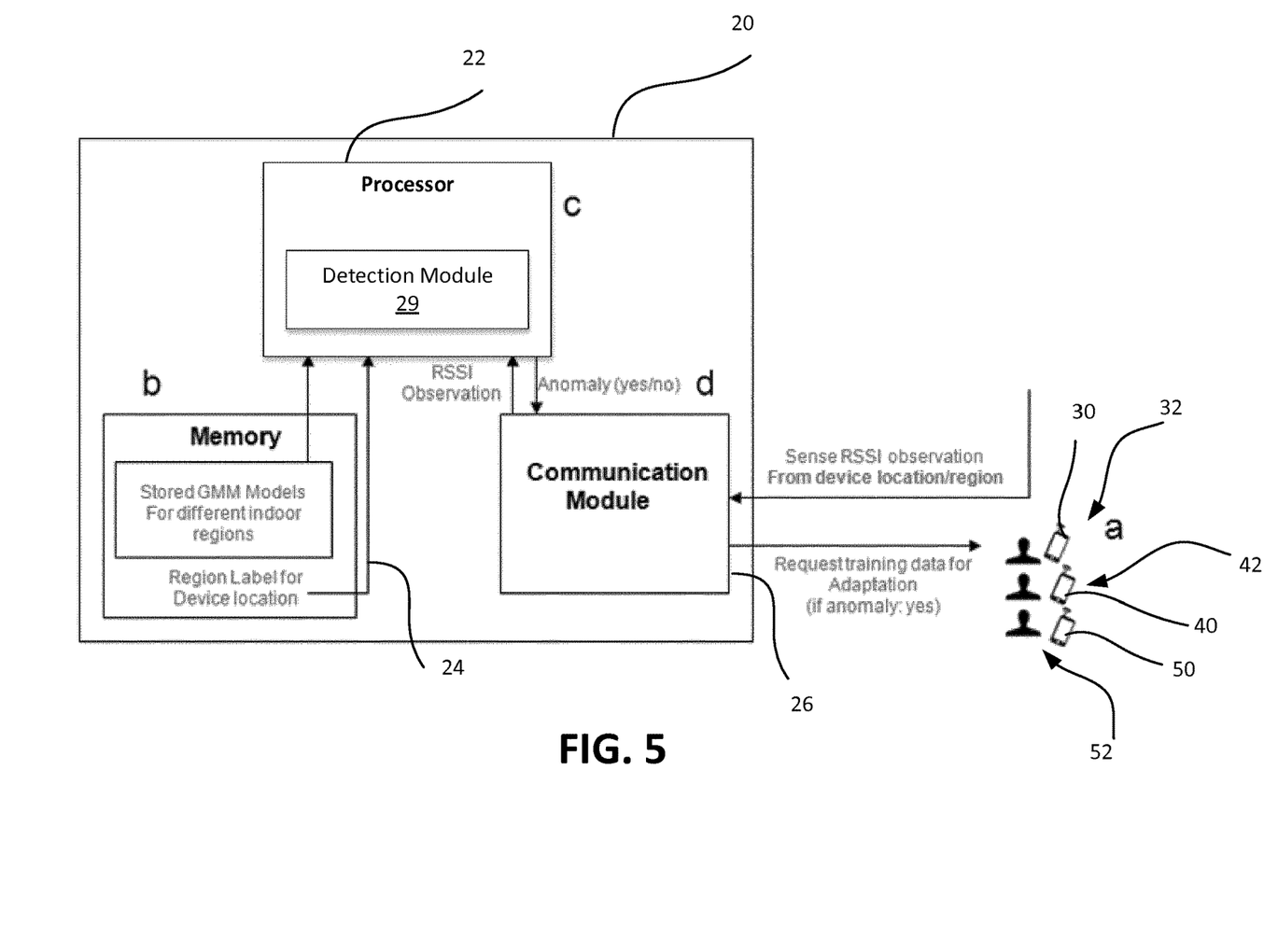
Figure 6:
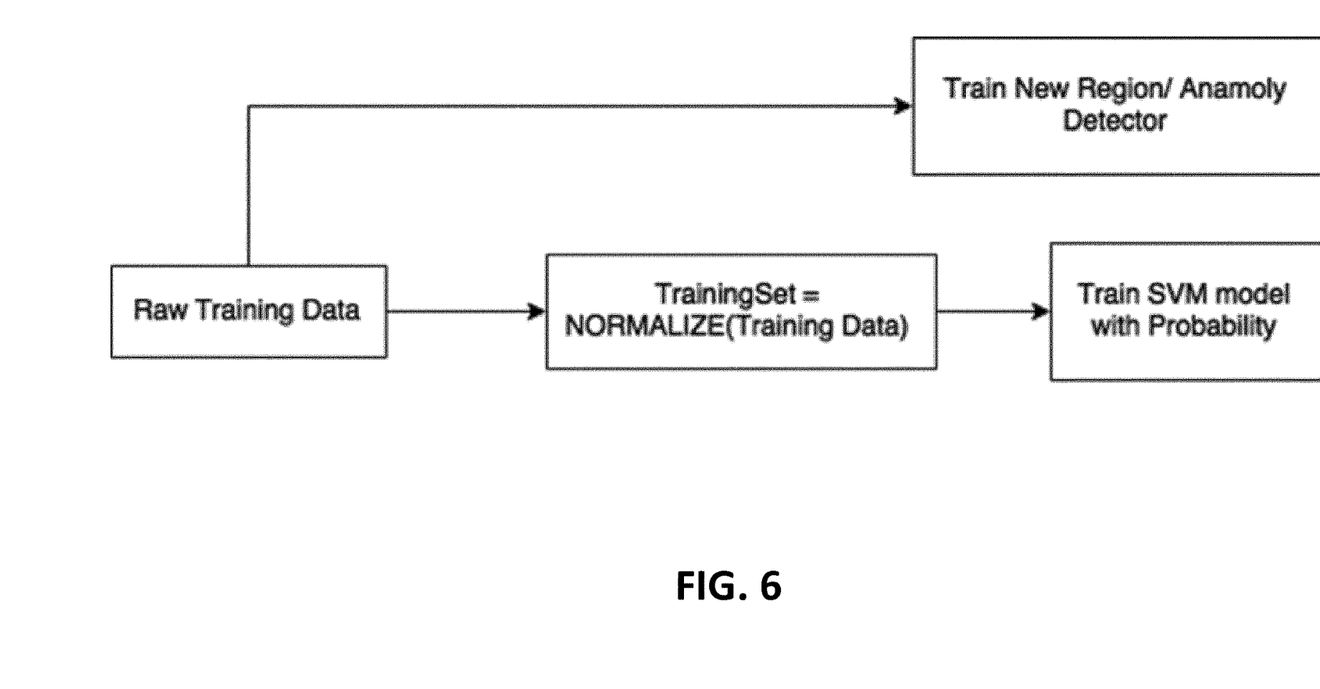
FIG. 6 illustrates a block diagram of a process for training performed by the self-adaptive device in accordance to one described embodiment of the disclosure.
Figure 7:
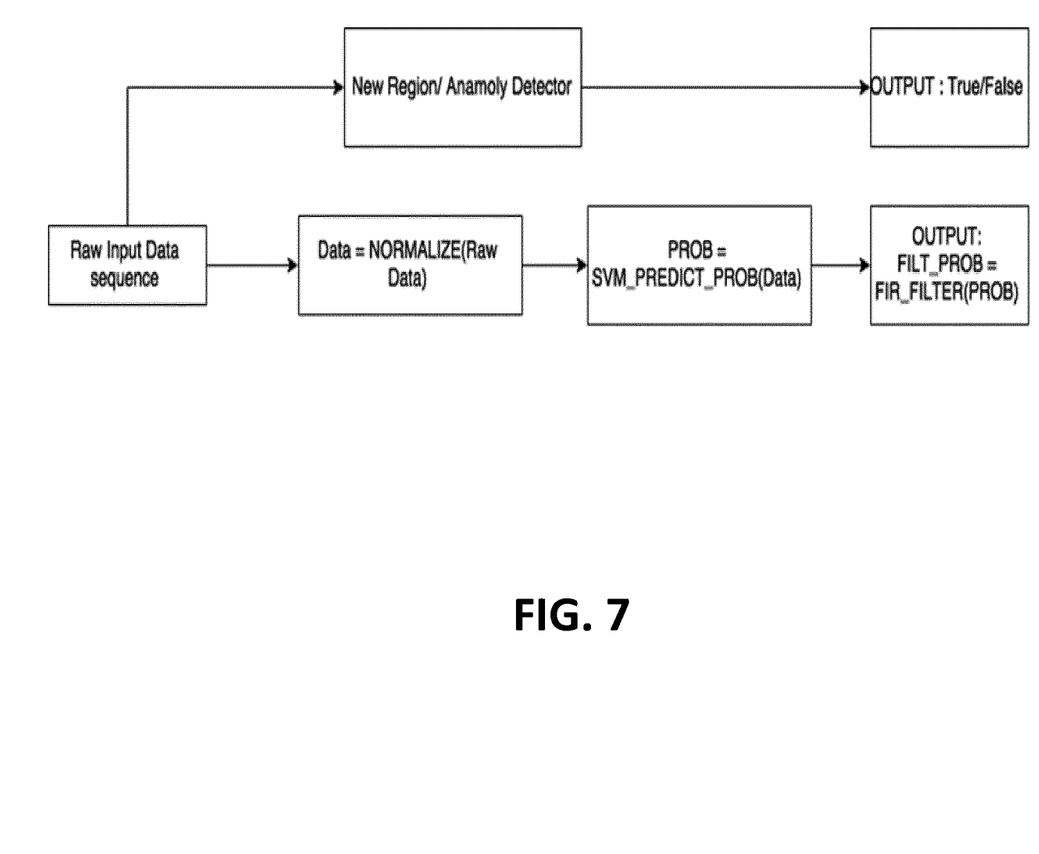
FIG. 7 illustrates a block diagram of a process for testing performed by the self-adaptive device in accordance to a further described embodiment of the disclosure.
Figure 8:
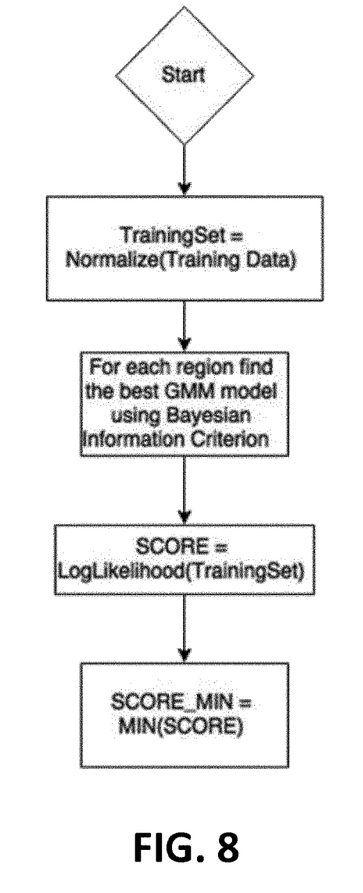
FIG. 8 illustrates a block diagram of a process for testing performed by the self-adaptive device in accordance to one described embodiment of the disclosure.
Figure 9:
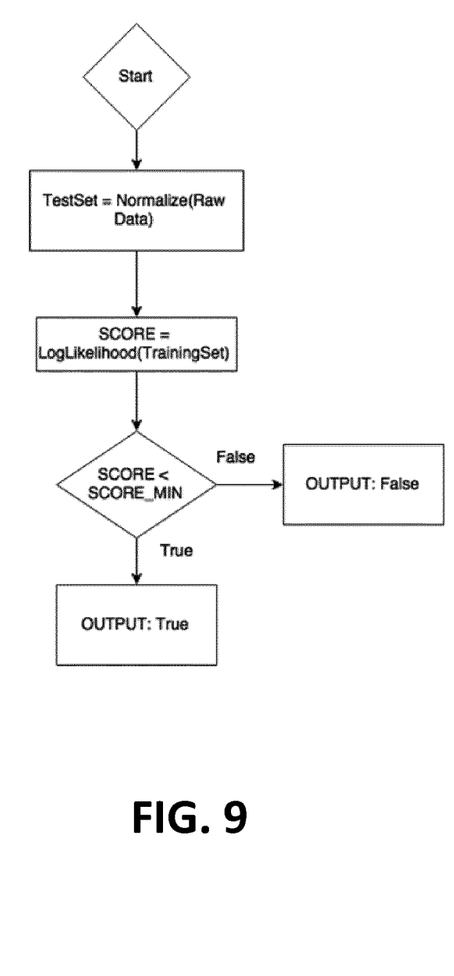
FIG. 9 illustrates a block diagram of a process for self-diagnosis performed by the self-adaptive device in accordance to one described embodiment of the disclosure.

FIGS. 3-5 illustrate various block diagram of an exemplary embodiment of a self-adaptive device 20. The device 20 includes a processor 22, a computing readable medium 24, and a communication interface module 26. These internal components are communicatively coupled through a system bus. The self-adaptive device 20 is communicatively coupled with a plurality of users 32, 42, 52 with client machines 30, 40, 50 located in different regions within an indoor space over a network. Although three client machines 30, 40, 50 and a single self-adaptive device 20 are illustrated, any number of client machines may be communicatively coupled to a plurality of self-adaptive devices. A server may be optionally integrated into the network. In some embodiments, one or more servers may be communicatively coupled to the client devices and the self-adaptive device. The server may be an application server, a certificate server, a mobile information server, an e-commerce server, a FTP server, a directory server, CMS server, a printer server, a management server, a mail server, a public/private access server, a real-time communication server, a database server, a proxy server, a streaming media server, or the like. The client machine can in some embodiments be referred to as a single client machine or a single group of client machines, while the server may be referred to as a single server or a single group of servers. In one embodiment, a single client machine communicates with more than one server, while in another embodiment a single server communicates with more than one client machine. In yet another embodiment, a single client machine communicates with a single server.

The network can comprise one or more sub-networks, and can be installed between any combination of the client machines, the server, and the self-adaptive device. In some embodiments, the network can be for example a local-area network (LAN), a metropolitan area network (MAN), a wide area network (WAN), a primary network comprised of multiple sub-networks located between the client machines, the server, and the self-adaptive device, a primary public network with a private sub-network, a primary private network with a public sub-network, or a primary private network with a private sub-network. Still further embodiments include the network that can be any network types such as a point to point network, a broadcast network, a telecommunication network, a data communication network, a computer network, an ATM (Asynchronous Transfer Mode) network, a SONET (Synchronous Optical Network) network, a SDH (Synchronous Digital Hierarchy) network, a wireless network, a wireline network, and the like. Depending on the application, other networks may be used so that data exchanged between the client machine and the self-adaptive device can be transmitted over the network. Network topology of the network can differ within different embodiments which may include a. bus network topology, a star network topology, a ring network topology, a repeater-based network topology, or a tiered-star network topology. Additional embodiments may include a network of mobile telephone networks that use a protocol to communicate among mobile devices, where the protocol can be for example AMPS, TDMA, CDMA, GSM, GPRS, UMTS, LTE or any other protocol able to transmit data among mobile devices. In some embodiments, the self-adaptive device 20 is a cloud computing device which may be communicated with via the Internet, and which may be co-located or geographically distributed, wherein shared resources, software, and information are provided to computers and other devices on demand for example, as will be appreciated by those skilled in the art. In another embodiment, the cloud base self-adaptive device 20 may be implemented as one or more servers which may be communicated with via the Internet.

The processor 22 may be of any type, including but not limited to a microprocessor, a microcontroller, a digital signal processor, or any combination thereof. The processor 22 may include one or more levels of caching, such as a level cache memory, one or more processor cores, and registers. Depending on the desired configuration, the processor 22 may be of any type, including but not limited to a microprocessor (µP), a microcontroller (µC), a digital signal processor (DSP), or any combination thereof. The processor may include one more levels of caching, such as a level cache memory, one or more processor cores, and registers. The example processor cores may (each) include an arithmetic logic unit (ALU), a floating point unit (FPU), a digital signal processing core (DSP Core), or any combination thereof. An example memory controller may also be used with the processor, or in some implementations the memory controller may be an internal part of the processor.

The computer readable medium 24 may be of any type including but not limited to volatile memory (such as RAM), non-volatile memory (such as ROM, flash memory, etc.) or any combination thereof. The memory 24 may include an operating system, a communication application, and program data. The communication interface module 26 allows software and data to be transferred between the computer system and other external electronic devices in the form of signals which may be, for example, electronic, electromagnetic, optical, or other signals capable of being received by the communication interface. The communication interface module 26 may be for example a modem, a network interface, a communication port, a PCM-CIA slot and card, or the like.

Now referring to FIG. 3, once the Wi-Fi signal is detected or observed, the communication interface module 26 captures Wi-Fi received signal strength indicator (RSSI) vector data, labels the detected signal with an ID associated with the region where in the signal originated from, and transmits the data to the computer readable medium 24. The computer readable medium 24 receives the Wi-Fi RSSI vector data as an input and stores Wi-Fi RS SI vector data including region labels 28. The processor 22 receives the Wi-Fi RSSI vector data with the region labels 28 from the computer readable medium 24 and trains a set of one-vs-all support vector machines (SVM). As an example, K indoor regions are identified in the indoor space. Each K one-vs-all support vector machines (SVM) is trained to decide if an observed RSSI vector came from a particular region "i" or the rest of the K−1 regions where i=1, . . . , K. The processor 22 deploys a Platt scaling technique, for example, on the SVM to compute probability distribution of a particular region given the observed RSSI data vectors before transmits the processed probability distribution parameters to the computer readable medium 24 for storing.

When an incoming RSSI vector arrives during recognition, as depicted in FIG. 4, these probabilities are computed by the processor 22 for all the K regions. After normalizing, the processor 22 determines the likelihood distribution over location labels given the observed RSSI data. These K-dimensional likelihood vectors are aggregated over multiple previous time steps to compute a filtered location likelihood distribution at each instant.

The self-adaptive device 20 is also capable to perform self-diagnosis in a dynamic Wi-Fi environment. As illustrated in FIG. 5, an anomaly detection module 29 in the processor 22 is deployed to perform a self-diagnosis process. If anomaly, e.g. the environment has changed, is detected, the processor 22 requests training data of the users for adaption through the communication interface module 26. Otherwise, the process stops. For training, testing, and self-diagnosis processes, these processes described above are further illustrated in FIGS. 6-9.

Figure 10:
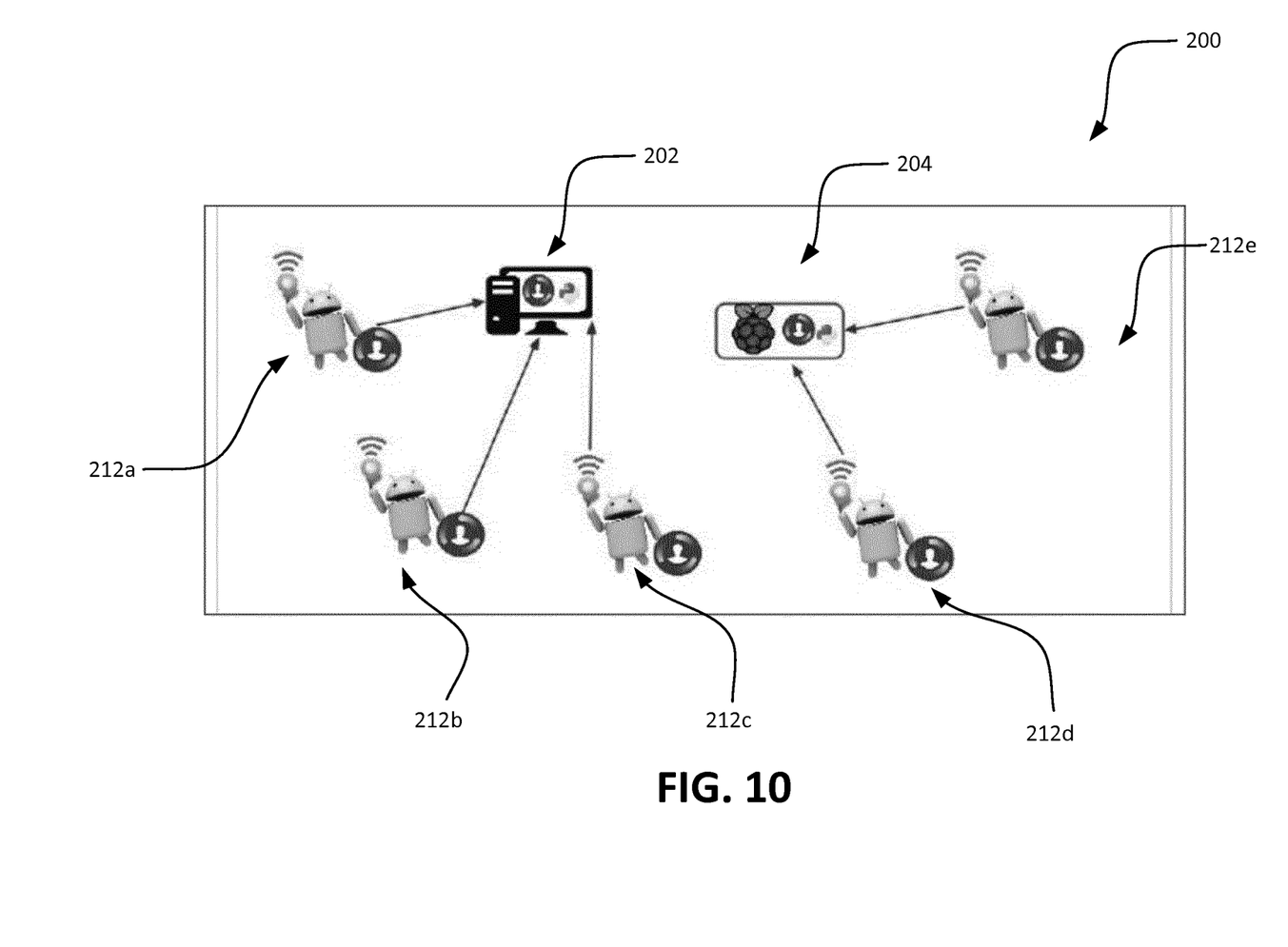
FIG. 10 is a floor plan illustrating a plurality of client devices communicatively coupled to a self-adaptive device over at least one server in accordance to one described embodiment of the disclosure.

FIG. 10 is a floor plan 200 illustrating a plurality of client devices 212a-212e communicatively coupled to a self-adaptive device 20 either connected to, communicatively coupled with, or integrated into at least one server 202, 204 in accordance to one described embodiment of the disclosure. Three client machines 212a-212c are communicatively coupled to a first server 202 and two remaining client machines 212d, 212e are communicatively coupled to a second server 204. As illustrated, the self-adaptive device 20 is integrated into the first and second servers 202, 204 configured to observe signal strength within the environment and enable indoor location awareness to the client devices 212a-212e in a public space.

Figure 11:
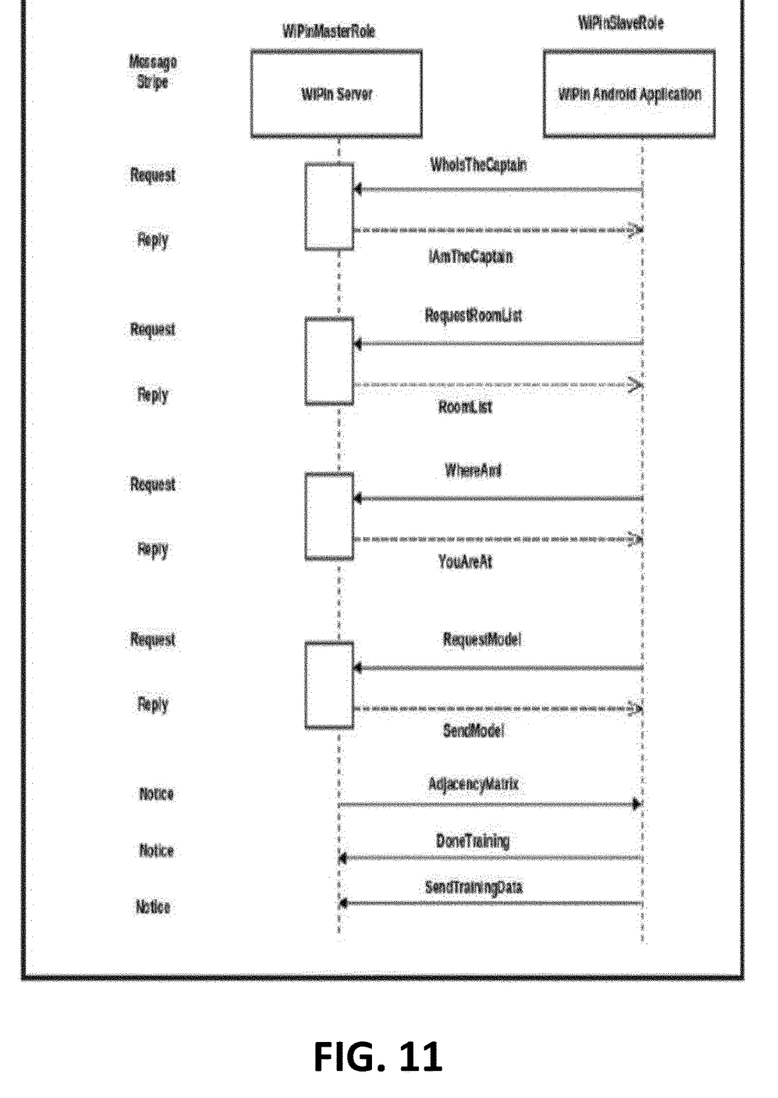
FIG. 11 is a diagram illustrating an internet-of-Things (IoTs) protocol for communication between a self-adaptive device implemented as a server and client machine of FIG. 10 in accordance to one described embodiment of the disclosure.

FIG. 11 is a diagram illustrating an internet-of-Things (IoTs) protocol for communication between a self-adaptive device implemented as a server and client machine of FIG. 10.

Figure 12:
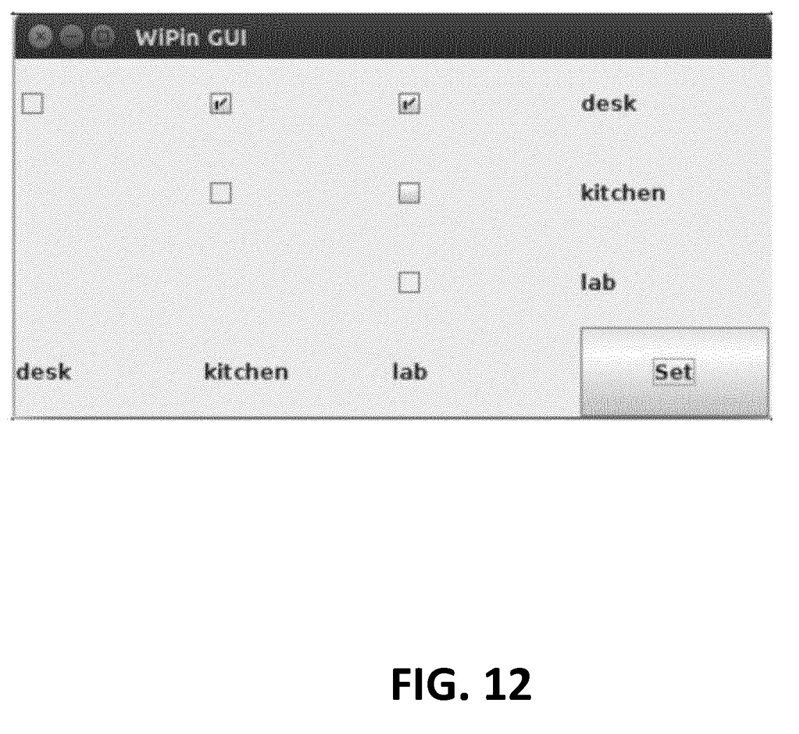
FIGS. 12 and 13 are diagrams depicting graphical user interfaces (GUIs) of the self-adaptive device in accordance to one described embodiment of the disclosure.
Figure 13:
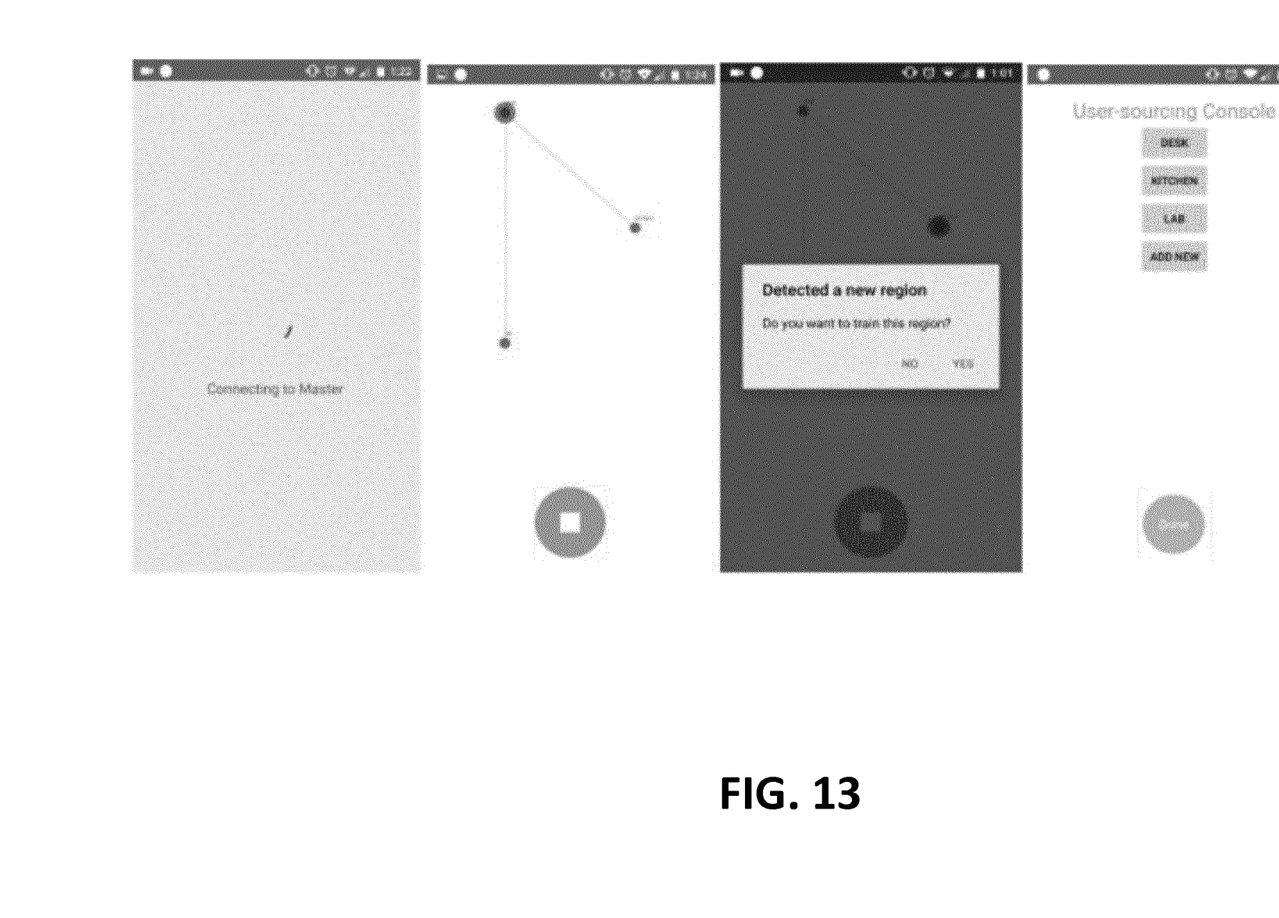

FIGS. 12 and 13 are diagrams depicting a graphical user interface (GUI) of the self-adaptive device that can be implemented as a server, a client machine, or combination thereof.

The self-adaptive device 20 uses clusters of measurements and a semantic label associated with a plurality of overlapping clusters in the signal strength measurement space. Each measurement vector includes signal strengths from several access points, which are visible to the client machine of the user. The self-adaptive device 20 can be communicatively coupled to any types of client machines. The semantic labels associated with each measurements have various levels of fidelity. For example, the semantic label may be referenced as a site (e.g., coffee shop, Department of Mechanical Engineering building, and so forth), a floor (e.g., 1st floor, top floor, and so forth), a room (e.g., my bedroom, my research lab, and so forth), or a region inside a particular room (e.g., near the entrance, near the bookshelf, and so forth). The self-adaptive device is configured to render a posterior probability of the location state (i.e. label) over a period of time. For example, the processor 22 processes the posterior probability model fitting on top of a discriminative classifier for region classification based on Wi-Fi signal strength vectors such as a support vector machine (SVM) for discriminative classification followed by Platt model, for example, fitting on SVM output for posterior probability estimation on location/regions labels. If a change in Wi-Fi environment is detected over time due to movement of the access points or their operating state either on mode or off mode, a machine learning models such as Gaussian Mixture Models (GMM) for each region is run on the self-adaptive device 20. The self-adaptive device 20 continues to observe or scan the environment of any changes, While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A self-adaptive device comprising:
   a non-transitory computer-readable medium configured to store (i) program instructions corresponding to a plurality of support vector machines, and (ii) probability distribution parameters corresponding particular regions in an environment, the plurality of support vector machines being configured to use the probability distribution parameters to predict a region of a respective mobile device in the environment based on corresponding signal strength data from the respective mobile device;
   a communication interface configured to communicate with a first mobile device in the environment; and
   a processor operably connected to the non-transitory computer-readable medium and the communication interface, the processor configured to:
      receive, with the communication interface, first signal strength data from the first mobile device in the environment;
      determine which particular region in the environment within which the first mobile device is located based on the first signal strength data, using the plurality of support vector machines and the probability distribution parameters; and
      transmit, with the communication interface, to the first mobile device, a region label corresponding to the determined particular region in the environment within which the first mobile device is located.

2. The self-adaptive device of claim 1, wherein the processor is configured to determine a posterior probability with respect to the determined particular region in the environment within which the first mobile device is located.

3. The self-adaptive device of claim 2, wherein the processor is configured to determine the posterior probability based on an output of the plurality of support vector machines using a Platt model.

4. The self-adaptive device of claim 2, wherein first signal strength data comprises at least one WiFi RSSI data vector with respect to the plurality of access points in the environment.

5. The self-adaptive device of claim 1, wherein the first signal strength data comprises a plurality of signal strengths with respect to a plurality of access points in the environment.

6. The self-adaptive device of claim 1, wherein the plurality of support vector machines includes a respective support vector machine for each particular region in the environment, each respective support vector machine being configured to predict whether a respective mobile device is in the corresponding region based on corresponding signal strength data from the respective mobile device.

7. The self-adaptive device of claim 1, wherein the processor is configured to detect whether the first mobile device is in a new region and, in response to detecting that the first mobile device is in a new region, request training signal strength data from the first mobile device.

8. A self-adaptive device comprising:
a non-transitory computer-readable medium configured to store (i) program instructions corresponding to a plurality of support vector machines and (ii) signal strength data with associated region labels, the region labels corresponding to particular regions in an environment of a plurality of mobile devices;
a communication interface configured to communicate with the plurality of mobile devices in the environment;
a processor operably connected to the non-transitory computer-readable medium and the communication interface, the processor configured to:
receive the signal strength data with the associated region labels from the plurality of mobile devices in the environment;
determine probability distribution parameters corresponding to each particular region in the environment by training the plurality of support vector machines with the signal strength data and the associated region labels, the plurality of support vector machines being configured to use the probability distribution parameters to predict a region of mobile devices in the environment based on corresponding signal strength data; and
store determine probability distribution parameters in the non-transitory computer-readable medium.

9. The self-adaptive device of claim 8, wherein the processor is further configured to request the signal strength data with the associated region labels from the plurality of mobile devices in the environment.

\* \* \* \* \*